No. 705,176. Patented July 22, 1902.
C. H. WHEELER & F. W. KREMER.
VEHICLE WHEEL.
(Application filed May 20, 1901. Renewed Apr. 28, 1902.)
(No Model.)
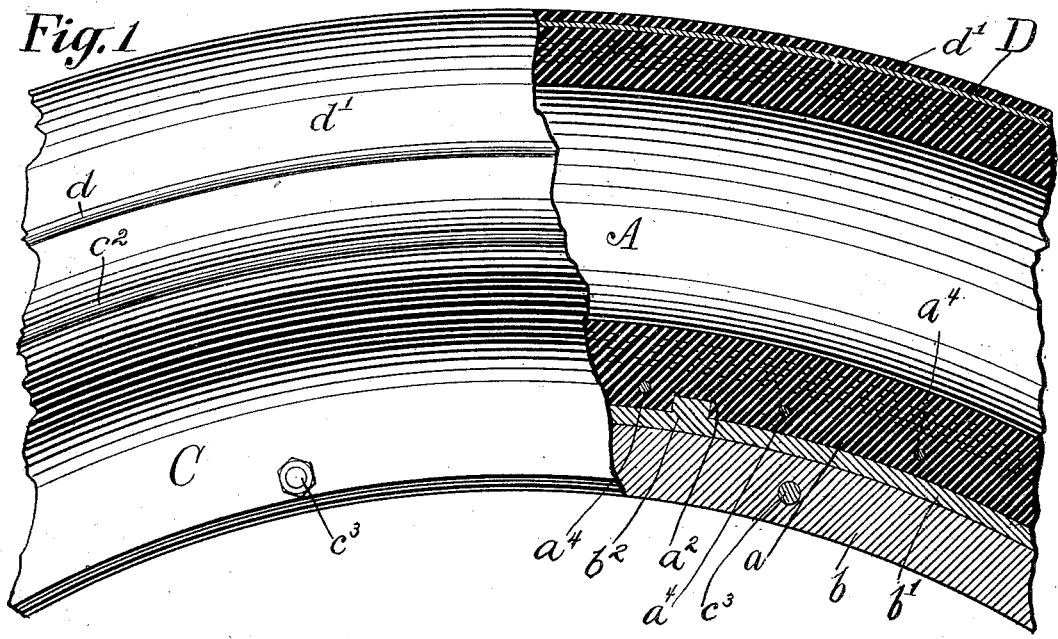
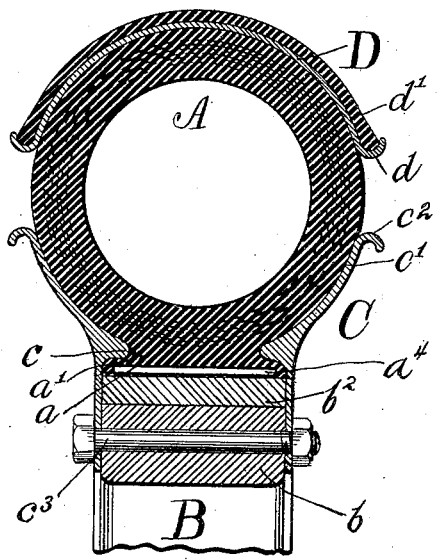
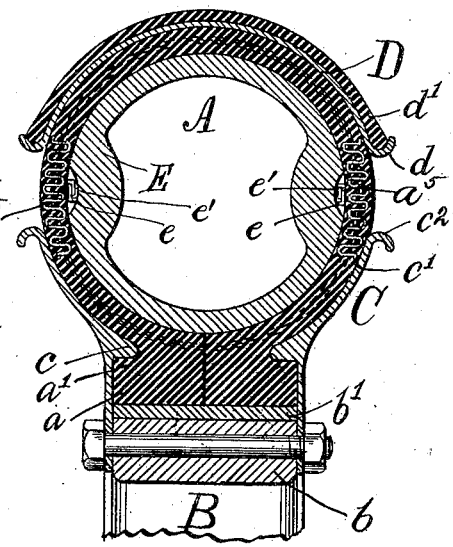
WITNESSES:
INVENTORS
Charles H. Wheeler and
Franklin W. Kremer
BY
Ernest Hopkinson
their ATTORNEY.
THE NORRIS PETERS CO., PHOTO-LITHO., WASHINGTON, D. C.

UNITED STATES PATENT OFFICE.

CHARLES H. WHEELER AND FRANKLIN W. KREMER, OF AKRON, OHIO; SAID WHEELER ASSIGNOR TO THE INDIA RUBBER COMPANY, OF AKRON, OHIO, A CORPORATION OF OHIO.

VEHICLE-WHEEL.

SPECIFICATION forming part of Letters Patent No. 705,176, dated July 22, 1902.

Original application filed May 4, 1900, Serial No. 15,445. Divided and this application filed May 20, 1901. Renewed April 28, 1902. Serial No. 105,003. (No model.)

*To all whom it may concern:*

Be it known that we, CHARLES H. WHEELER, residing at No. 208 Silver street, and FRANK-LIN W. KREMER, residing at No. 100 Rosedale Place, in the city of Akron, county of Summit, and State of Ohio, citizens of the United States, have invented a new and useful Improvement in Vehicle-Wheels, of which the following is a specification.
The present invention relates to vehicle-wheels and tires.

Primarily the object of the invention is to provide a wheel and tire particularly adapted for use in connection with comparatively heavy vehicles, such as automobiles. The invention is not limited, however, to use in connection with automobiles, as it may be found advantageous to use the same in connection with bicycles, tricycles, and similar like constructions.

The object of the invention is also to provide a vehicle with new and improved means for securing a rubber tire in position on the wheel-rim. To this end instead of making the usual channel in a single piece we make the rim of several parts to constitute the channel and provide coacting devices for securing the channel members, rim, and tire together.

In the drawings accompanying this specification we have illustrated constructions embodying the principles of the present invention. While said drawings illustrate constructions which we have actually made and found to be practicable, it will be understood that we do not limit ourselves to the precise forms shown.

In said drawings, Figure 1 is a view, partly in side elevation and partly in longitudinal central section, of the structure shown in Fig.
3. Figs. 2 and 3 are views in cross-section.

In said drawings like letters of reference refer to like parts throughout the several views thereof.

Referring to said drawings in detail, and especially to Fig. 1, A designates a pneumatic tire, which is here shown of the single-tube type; but it will of course be apparent that the invention is not limited to pneumatic tires, as the channel members and the means for securing them to the rim and the tire in position are equally applicable to solid tires. Said tire is provided with a securing base-piece $a$, having, as illustrated in the drawings, at each side a circumferential groove $a'$. Circumferentially spaced apart along the inner face of the base-piece are transverse recesses $a^2$, into which fit corresponding lugs formed on the wheel-rim.

B designates the wheel-rim, consisting, as here shown, of the wooden felly $b$ and the metal rim $b'$, the metal rim being provided with projecting lugs $b^2$, extending transversely across the metal rim $b'$ and fitting in the recesses $a^2$ of the tire. On each side of the felly is secured one of the two seating and retaining members C, the outer peripheries of which project beyond the periphery of the rim and constitute with the rim the channel within which the tire is seated. Each of these channel members is provided with an inwardly-projecting circumferential shoulder $c$, engaging the groove $a'$, formed in the tire, and (in the case of a pneumatic tire) each is provided with an outwardly-curved seating portion $c'$, terminating in a bent-over lip $c^2$. These members C may be secured in any desired manner, as by bolts $c^3$. It will be understood, of course, that these channel members may be made in sections, if desired.

Circumferentially extending around the tire, at the tread portion thereof, (in the case of a pneumatic tire,) is a continuous band D, of metal, which constitutes a shoe for the purpose of protecting the tire against puncture, affording a wearing-surface and at the same time coacting with the tire-channel to withstand the internal air-pressure of the tire. This band or shoe D is shown as curved to the circle of the tire and extending laterally about one-sixth the circumference of the tire on each side of the central line of the tread. It is provided with the bent-over lips $d$ and a sound-deadening strip $d'$, which may be of rubber or any suitable material.

The functions of each of the details of construction will be apparent from the following: In assembling the parts one of the members C is first secured to the felly, the tire placed on the rim of the wheel from the opposite side, with its recesses $a^2$ engaging the lugs $b^2$, and then forced down upon the member C until the shoulder $c$ thereof is seated in the tire-groove $a'$. The opposite member C is then placed in position, with its shoulder $c$ engaging the corresponding groove $a'$. The two members C are then secured together by the bolts $c^3$, and in connection with this it will be understood that the thickness of the base-piece of the tire may be somewhat in excess of the distance between the two members C when they are in final position, so as to obtain any desired amount of clamping action. If the tire is a pneumatic tire, the band or shoe D is now placed in position over the tread portion of the tire and inflated. As the tire is inflated it expands until the outer shoe or band is frictionally held in position thereby. The inflation may now go on until the desired cushioning strength of the tire is obtained, the greater the internal air-pressure the stronger the frictional contact between the tire and the band or shoe D. In practice we have depended upon this frictional contact to secure the band D in position; but, if desired, the band D and the outer periphery of the tire may be provided with coacting parts to positively prevent longitudinal motion of said band relatively to the tire. It will be seen that the outer band D and the seating channel members C protect the tire for a considerable portion of its circumference, except along the exposed space between the bent-over lips $c^2$ of the channels and the similar lips of the band D. This space permits of the yielding action necessary to obtain the pneumatic cushioning effect. As an additional safeguard to prevent the unseating of the tire there are shown metal pieces $a^4$ as secured in the base-piece and extending underneath the inwardly-projecting shoulders $c$ of the members C.

In Fig. 2 we have illustrated the construction embodying the invention as applied to a double-tube tire. In this construction the air-confining tube is designated by the letter E and is provided with thickened side walls. On the outside of this air-tube an upturned hook $e$ is secured, this hook engaging with a downwardly-turned hook $e'$, secured to the inner face of the outer tube. The object of thickening the side walls of the inner tube is to cause said tube in deflating to collapse inwardly and carry with it the outer tube. Therefore in case of extraordinary accident causing a puncture or the intentional mutilation of the tire it would collapse inwardly and form a rubber cushion between the outer band or shoe D and the seating members C. Under these conditions the bent-over lips of the shoe or band D are adapted to come in contact with the lips of the members C to form a positive support for the vehicle. In said Fig. 2 the outer tube is cut circumferentially through the center of the base-piece. After being cut it is opened out and the reinforcing fabric $a^4$, where the tire is unsupported by either the outer band or shoe D or the seating members C, stitched to the outer wall, as by stitches $a^5$. This makes the tire exceedingly strong at the only point where the internal air-pressure is withstood by the walls of the tire alone and effectually prevents the layers of reinforcing fabric from detaching from each other or from the rubber wall.

The advantages of our invention will be obvious. By providing the tire with the recesses $a^2$ and the rim with the lugs $b^2$ the tire is prevented from moving longitudinally relatively to the rim when the parts are secured together. The channel members C, provided with shoulders, positively hold the tire to the rim uniformly throughout each and every portion of its length. The outer band or shoe D forms an absolute preventive of punctures of the tire at the tread portion, constitutes a wearing-piece, takes up and distributes the supporting and driving strains throughout a large portion of the circumference of the wheel, and, acting in conjunction with the extended curved seat of the members C and the internal air-pressure of the tire, helps to hold the tire in position. The turned-over lips of the band D, together with the turned-over lips of the members C, form a lateral guard for the exposed portion of the tire between them.

Of course we do not by the specific description of the particular embodiment of the invention illustrated in this application intend to limit the invention thereto, as probably other forms of tire—solid, cushion, or pneumatic—as well as securing parts, may be devised without departing from the spirit of the invention.

What is claimed as new is—

1. In a vehicle-wheel, the combination of a rim, a tire provided with a base-piece, transverse recesses formed in said base-piece, corresponding transverse pieces engaging said recesses, a channel composed of two side members secured to the rim, each of said side members being provided with a shoulder engaging a corresponding groove formed in the tire, and transverse rods in the base-piece of the tire, the ends of said rods extending under the shoulders of the side members, substantially as specified.

2. In a vehicle-wheel, the combination of a rim, a tire provided with a base-piece, transverse recesses formed in said base-piece, corresponding transverse pieces engaging said recesses, a channel composed of two side members secured to the rim, each of said side members being provided with a shoulder engaging a corresponding groove formed in the tire, transverse rods in the base-piece of the tire, the ends of said rods extending under the shoulders of the side members, and an outside band or shoe, substantially as specified.

3. In a vehicle-wheel, the combination of a rim, a tire provided with a base-piece, transverse recesses formed in said base-piece, corresponding lugs on the rim engaging said recesses, a channel composed of two side members secured to the rim, each of said side members being provided with a shoulder engaging a corresponding groove formed in the tire, transverse rods in the base-piece of the tire, the ends of said rods extending under the shoulders of the side members, the outer edges of the side members being turned over to form lips, substantially as specified.

4. In a vehicle-wheel, the combination of a channel, a pneumatic tire seated therein, an outside band or shoe, said pneumatic tire consisting of an air-tube having thickened side walls, and an outer envelop, and means for positively engaging the outer surface of the air-tube with the inner surface of the envelop, whereby, upon deflation, the air-tube will collapse inwardly, drawing with it the outer envelop, substantially as specified.

5. A pneumatic tire comprising an inner tube, an outer envelop cut circumferentially along the central line of the base, said outer envelop being provided with a fabric reinforcement secured to the said walls by stitching, substantially as specified.

In testimony whereof we have hereunto set our hands in the presence of two subscribing witnesses.

CHARLES H. WHEELER.
FRANKLIN W. KREMER.

Witnesses:
RICHARD WARD,
ERNEST H. SHRIVER.